Aug. 30, 1932.　　　J. CANNIZZARO　　　1,874,239

ROTARY INTERNAL COMBUSTION ENGINE

Filed April 6, 1928　　　9 Sheets-Sheet 5

Fig. 11.

Intake

Fig. 12.

Compression

Aug. 30, 1932.     J. CANNIZZARO     1,874,239
ROTARY INTERNAL COMBUSTION ENGINE
Filed April 6, 1928     9 Sheets-Sheet 8

Fig. 13.
Explosion

Fig. 14.
Exhaust

Inventor
J. Cannizzaro
By Lacey & Lacey, Attorneys

Aug. 30, 1932.   J. CANNIZZARO   1,874,239

ROTARY INTERNAL COMBUSTION ENGINE

Filed April 6, 1928    9 Sheets-Sheet 9

Fig. 14A.

Exhaust.

Fig. 15.

End of Compression Cycle.

Inventor
J. Cannizzaro.
By Lacey & Lacey,
Attorneys

Patented Aug. 30, 1932

1,874,239

UNITED STATES PATENT OFFICE

JOSEPH CANNIZZARO, OF UNION CITY, NEW JERSEY

ROTARY INTERNAL COMBUSTION ENGINE

Application filed April 6, 1928. Serial No. 267,987.

The present invention is directed to improvements in rotary gas engines more particularly designed for use in connection with air craft, but not necessarily limited to such use.

The primary object of the invention is to provide an engine of this character including a plurality of rotors of triangular form, and arranged with their longitudinal axis in parallel relation.

Another object of the invention is to provide an engine of this type wherein the individual rotors coact with each other to define a chamber for receiving the explosive charge for turning the rotors in counter-clockwise direction to transmit their power to a power shaft, in this instance, the propeller shaft of an air craft.

Another object of the invention is to provide the rotors with convex sides which are adapted to lie in such close proximity as to prevent leakage with minimum friction.

Another object of the invention is to provide the rotors with fuel inlet means mounted directly within the individual rotors.

Another object of the invention is to provide an engine so constructed that the rotors will turn two or more times the speed of the driven shaft, thereby enabling the rotor to more readily react to the kinetic and pressure forces of the gases.

Another object of the invention is to construct the rotors in such manner that they will be maintained in a cool state by air currents passing thereby, the air currents also serving to carry away the exhaust gases.

Another object of the invention is to provide an efficient air-cooled engine of this type which is light in weight in proportion to its power.

Another object of the invention is to provide an engine wherein reciprocating parts are eliminated, thus eliminating momentum losses and relieving the engine of shocks and vibrations characteristic in engines of the reciprocating type.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1:
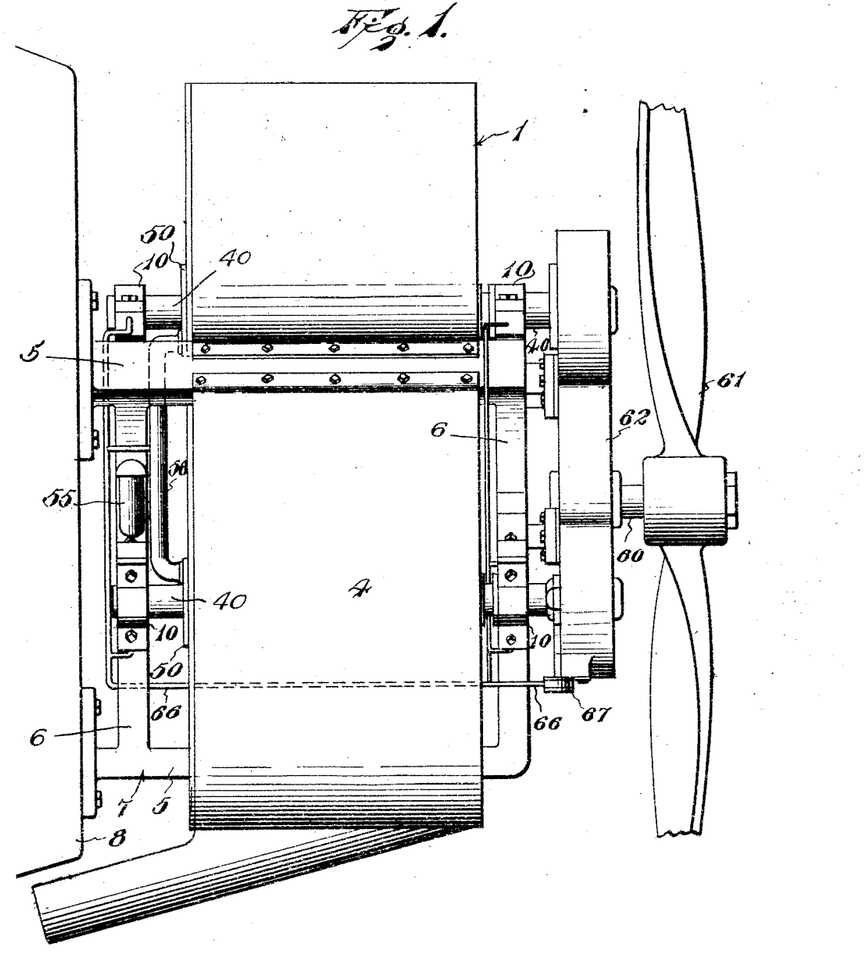
Figure 1 is a side elevation of the engine, showing it in place upon a section of fuselage.
Figure 2:
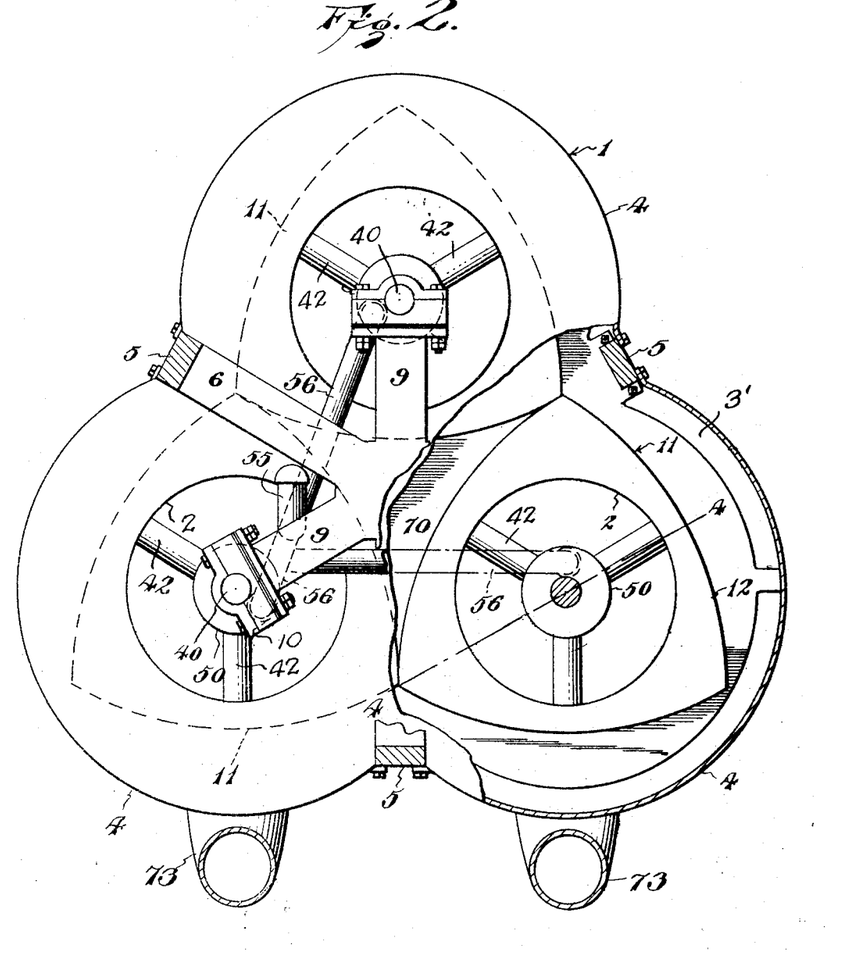
Figure 2 is a rear elevation of the device.
Figure 3:
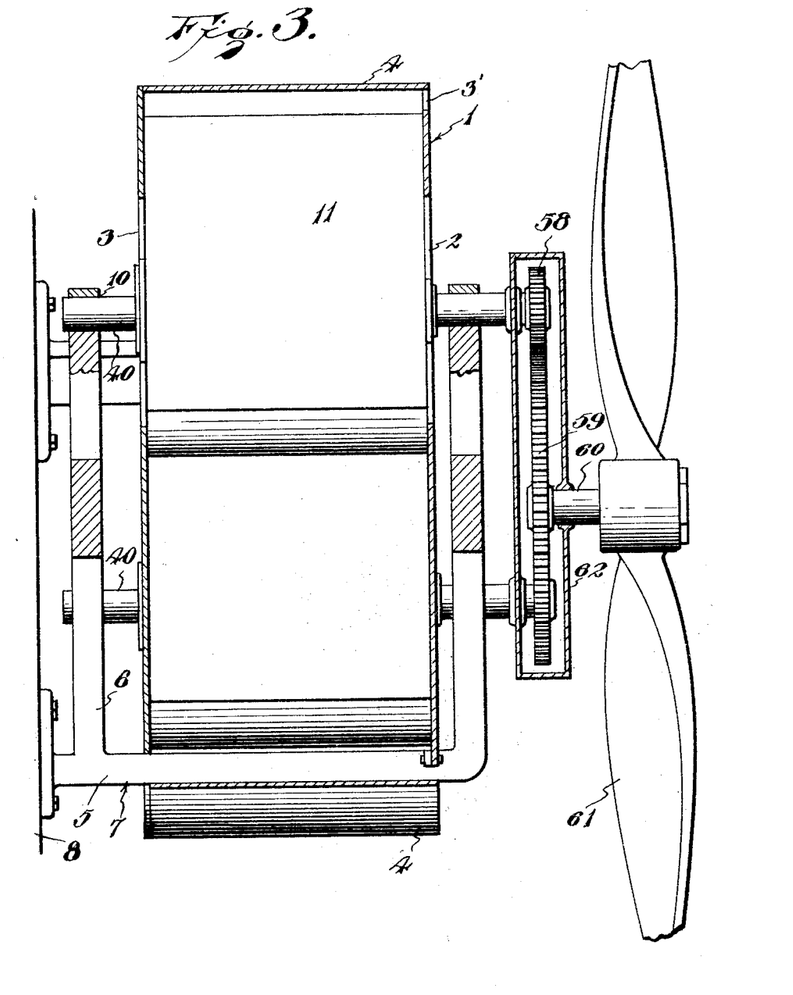
Figure 3 is a vertical sectional view through the casing.

Referring to Figs. 1, 2 and 3 of the drawings, 1 designates the casing shaped to conveniently contain, in this instance, three rotors, said casing having its front and rear walls provided with alined openings 2 and 3, respectively, and peripheral openings 3'. The casing 1 consists of three hoods 4 and end plates which are detachably connected to the bars 5 supported by the radially arranged arms 6 of the frame 7, said frame being supported by the fuselage 8. The frame 7 also carries radially disposed standards 9, three in number, which are provided upon their outer ends with adjustable bearings 10.

Figure 4:
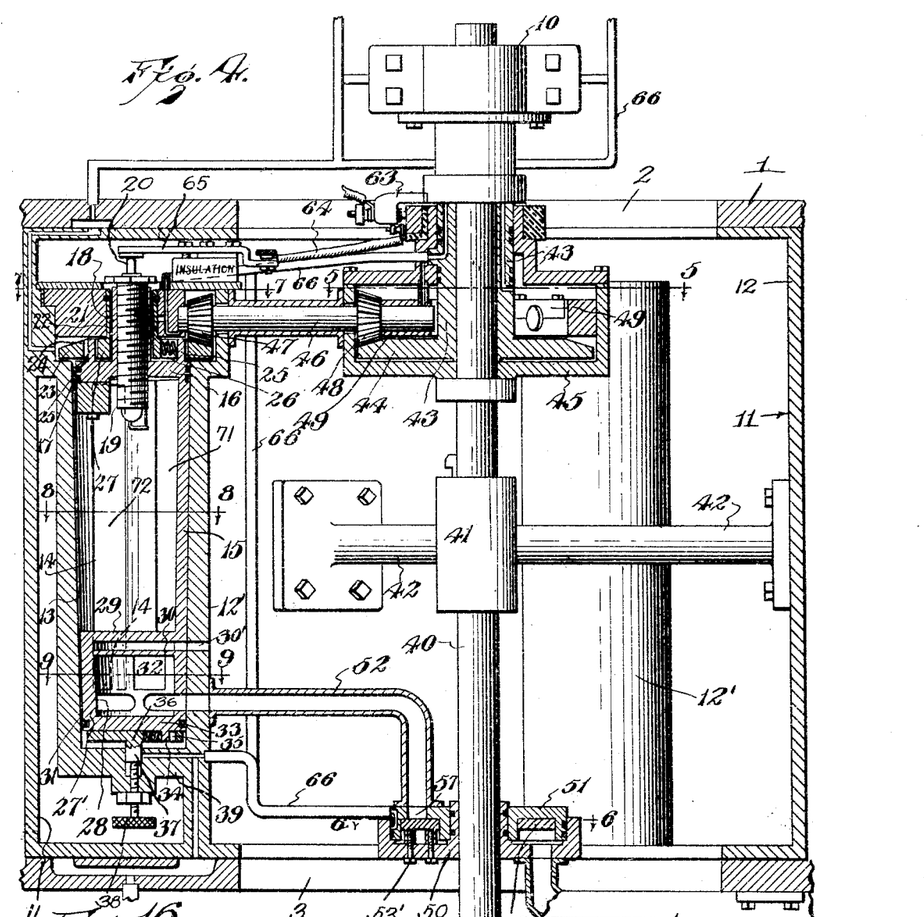
Figure 4 is an enlarged sectional view on line 4—4 of Figure 2.
Figure 5:
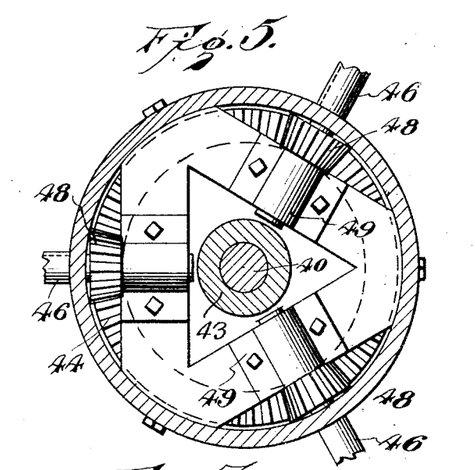
Figure 5 is a sectional view on line 5—5 of Figure 4.
Figure 11:
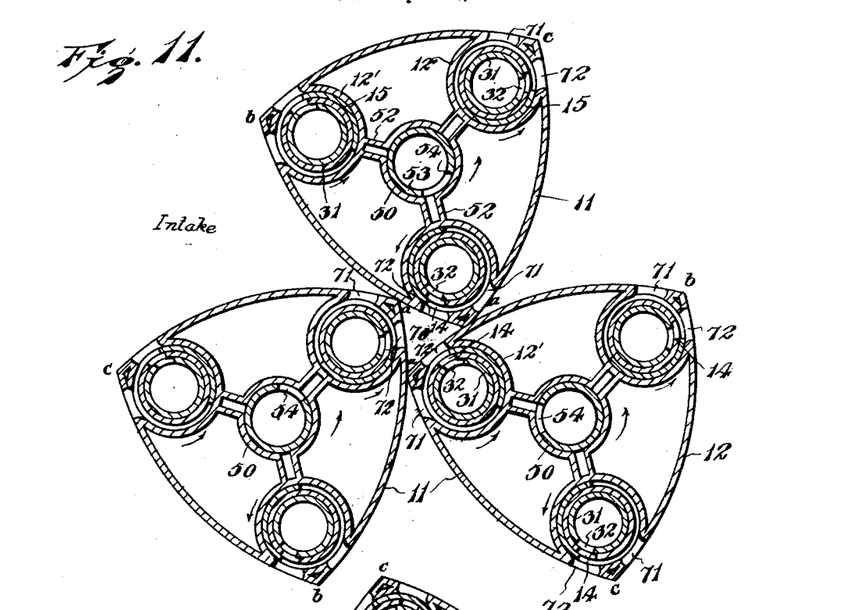
Figure 11 is a diagrammatic view, showing the rotors in their intake position, and illustrating the valves as though all were located in the same plane.
Figure 11A:
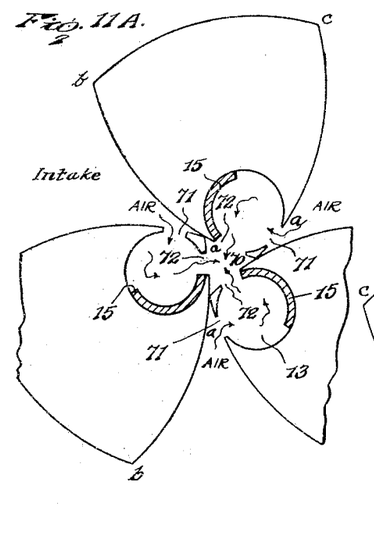
Fig. 11A is a view similar to Fig. 11 but showing only the air intake valve positions.
Figure 11B:
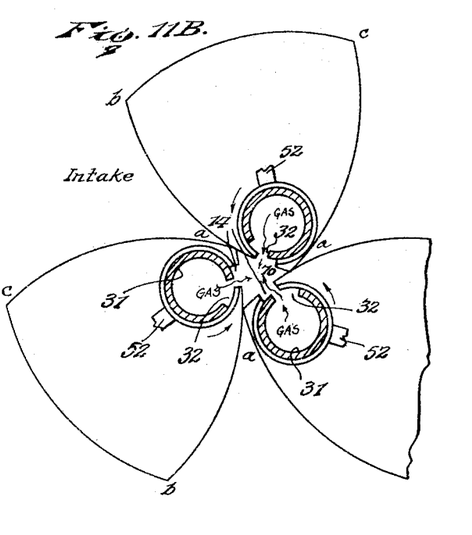
Fig. 11B is a view similar to Fig. 11 but showing only the gas intake valve positions.

In the present embodiment of the invention, three triangular rotors 11 are employed, identical in construction. Therefore the following description of one will suffice for all. Each rotor comprises a triangular shaped shell 12, the sides of which are somewhat convexed, the convexity thereof equalling that of a sixty-degree arc of a circle. Each corner of each shell is provided with a longitudinal tubular body 12', see Fig. 4, constituting a combustion chamber 13 and in which is formed a longitudinal port 14. Rotatable in the chamber 13 is a valve plate 15, arcuate in cross section and of such size as to alternately open and close the port 14, as shown in Fig. 4 and Fig. 11B. The forward end of the plate 15 is formed with a head 16 having packing rings 17 carried thereby, said head having a sleeve 18 in which the spark plug 19 is threaded, said plug having a contact pin 20 upon its outer end. A bearing block 21 is fitted in the upper end of the combustion chamber body and has rotatably engaged therein the hollow stem 22 and into which the sleeve 18 extends, said stem having carried thereby a beveled gear 23, said gear having an opening 24 therein for receiving the pins 25 of the head 16, there being a coil spring 26 between the hub 27 of the gear and one of the pins to urge the valve plate 15 into close contact with the combustion chamber wall, and to prevent, due to its flexibility, the tending of the valve plate to bind when heated.

The arcuate valve plate 15 has formed integral therewith a casing 27', see Fig. 4, constituting an inlet chamber which occupies the inner end of the tubular body 12'. This chamber is separated from the chamber 13 by spaced partitions 29 and 30 to provide a cooling space 30'.

Figure 9:
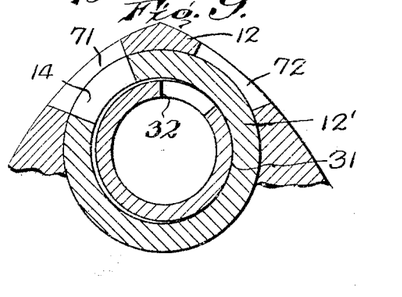
Figure 9 is a sectional view on line 9—9 of Figure 4.

The casing 27' carries a sleeve valve 31 provided with a port 32, see Figs. 9 and 11B, for alternate registration with the inner end of the port 14 as the casing rotates.

The end wall 33 of the casing 27' has a projection 34 which extends into a slot 35 formed in a disk 36, there being a coil spring in the slot for engaging the projection to urge the valve plate 15 toward the tubular body 12' and coact with the spring 26 to maintain said valve plate snugly engaged with the wall of the tubular body. Depending from the disk 36 is a lug 37 which is engaged with a screw 38 carried by the end wall 39 of the tubular body 12' in order to reduce friction on the arcuate valve plate 15.

Extending centrally through the rotor 11 is a shaft 40 keyed in the sleeve 41, said sleeve having radial arms 42 which have their outer ends fixed to the rotor shell 12, said shaft being journaled in the bearings 10—10.

Fixed in any suitable manner to the forward bearing 10 is a collar 43, see Fig. 4, having formed integral therewith, at its inner end, a beveled gear 44, said gear being confined in the housing 45 which is loose upon the shaft 40. A shaft 46 extends between the gears 23 and 44 and has fixed to its ends beveled gears 47 and 48 which mesh, respectively, with the gears 23 and 44.

The outer ends of the shafts are journaled in the blocks 21 while the inner ends thereof are journaled in the bearings 49 mounted in the housing 45.

Figure 6:
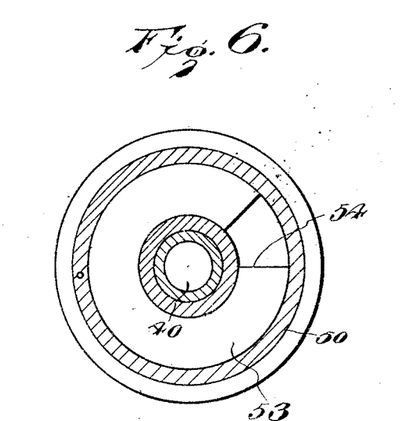
Figure 6 is a sectional view on line 6—6 of Figure 4.
Figure 7:
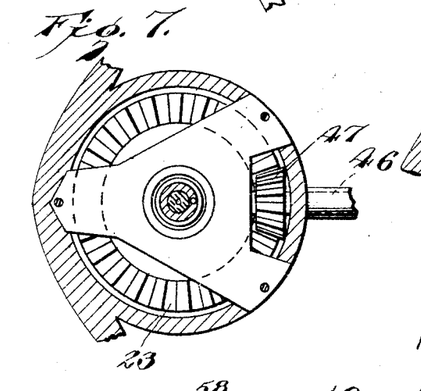
Figure 7 is a sectional view on line 7—7 of Figure 4.
Figure 8:
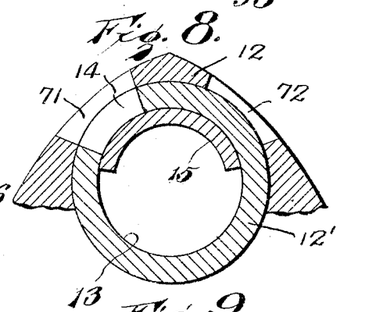
Figure 8 is a sectional view on line 8—8 of Figure 4.

Each shaft 40 has engaged thereon a fuel manifold 50, see Fig. 1 and Fig. 4, which is stationarily supported in any suitable manner and has rotatably engaged therein a head 51 and leading from said head to each tubular body 12' is a fuel conducting pipe 52 which opens into inlet chambers 28 formed in the combustion chambers. Fixed in the manifold 50 is a split ring 53 held in place by set screws 53', the resultant space between the ends constituting a port 54, see Fig. 6. Leading from the carburetor 55, see Fig. 1, are pipes 56 which open into the manifold under the ring 53, see Fig. 4. The ends of the pipes 52 are connected to the heads 51 through ports 57 which are adapted to successively register with the ports 54 in order that fuel will be successively conducted to the inlet chambers 28. The forward ends of the shafts 40 have pinions 58 fixed thereto which mesh with a relatively large gear 59 to which the shaft 60 carrying the propeller 61 is fixed. A protective casing 62 encloses the gear 58 and gear 59.

Figure 15:
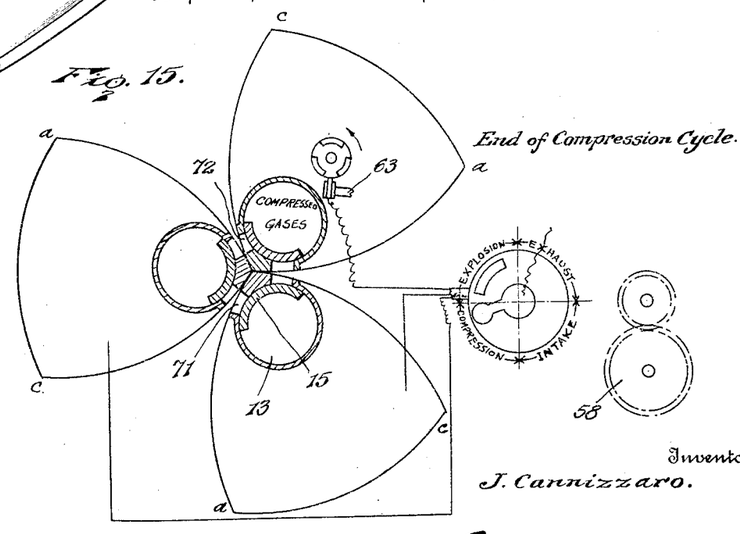
Fig. 15 is a diagrammatic view showing the valve positions at the end of the compression cycle and showing the ignition system.

A commutator structure 63, Fig. 15, is associated with each collar 43 in order that current will be supplied to the wire 64 connected with the arms 65 which bear on the contact pins 20 of the plugs 19. In this manner the spark is timed in the combustion chambers 13.

An assembly of tubes 66 is provided for furnishing lubricant to the various parts, the lubricant being forced by a pump 67, see Fig. 1.

It will be observed upon reference to Figures 11 to 15, inclusive, that the rotors are so related that an expansible substantially triangular chamber 70 is defined between and by the shells 12 of the rotors and which will vary in size during the rotation of the rotors.

Figure 16:
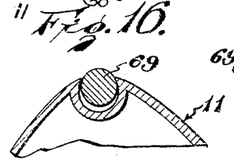
Figure 16 is a detail sectional view through a modified form of the invention, showing the rotors provided with anti-friction rollers.
Figure 17:
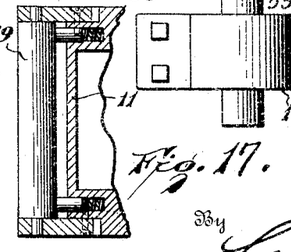
Figure 17 is a similar view taken at right angles through Figure 15.
Figure 18:
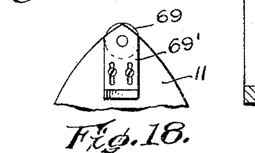
Fig. 18 is a fragmentary end elevation of the parts shown in Fig. 17.

In Figures 16, 17 and 18 the rotors 11 are shown provided with rollers 69 which may be mounted in the apices by means of side plates 69' and are adapted to roll upon the sides thereof.

In operation combustible fuel is conducted through the pipe 56 to the respective manifolds 50 of the rotors and from thence through the pipe 52 into the inlet chamber 28, the flow to the proper chambers being obviously controlled by the ports 57. As shown in Figures 11, 11A and 11B the rotors are in their intake position, at which time the valves 31 and 15 are opening the ports 32 as well as unsealing the ports 71 formed in the apices of the rotors to permit fuel and air to pass through the ports 72 formed in said rotors at the apexes thereof, all of which ports are now open into the chamber 70.

Figure 12:
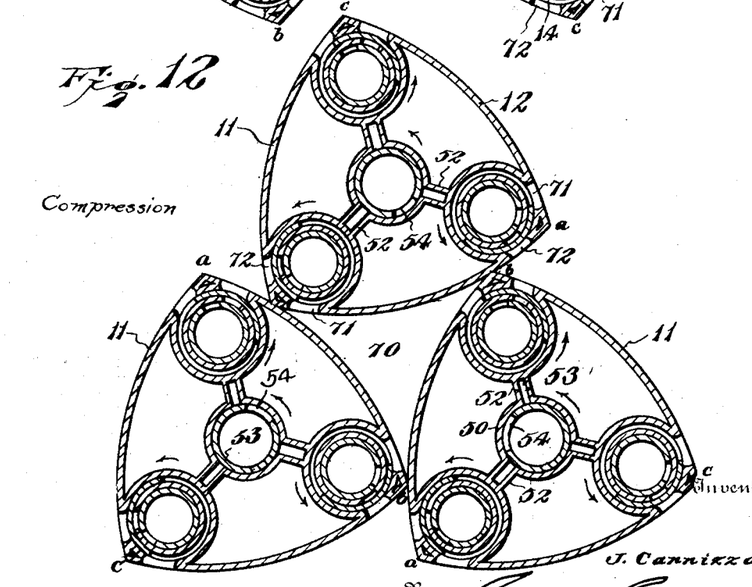
Figure 12 is a diagrammatic view showing the rotors in the positions assumed for compressing the motive fuel.
Figures 12A, 13A:
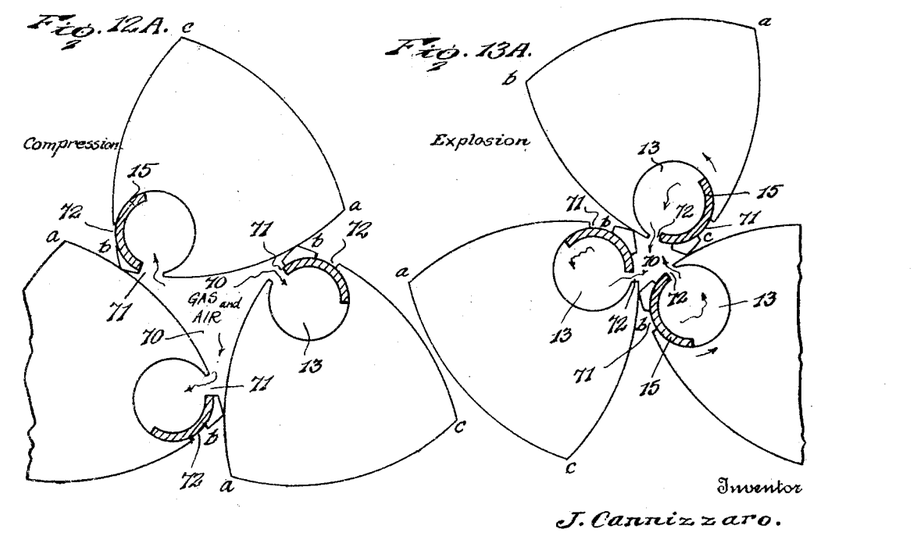
Fig. 12A is a view similar to Fig. 12 but showing only the valves illustrated in Fig. 11A.
Fig. 13A is a view similar to Fig. 13 but showing only the valves illustrated in Fig. 11A.
Figure 13:
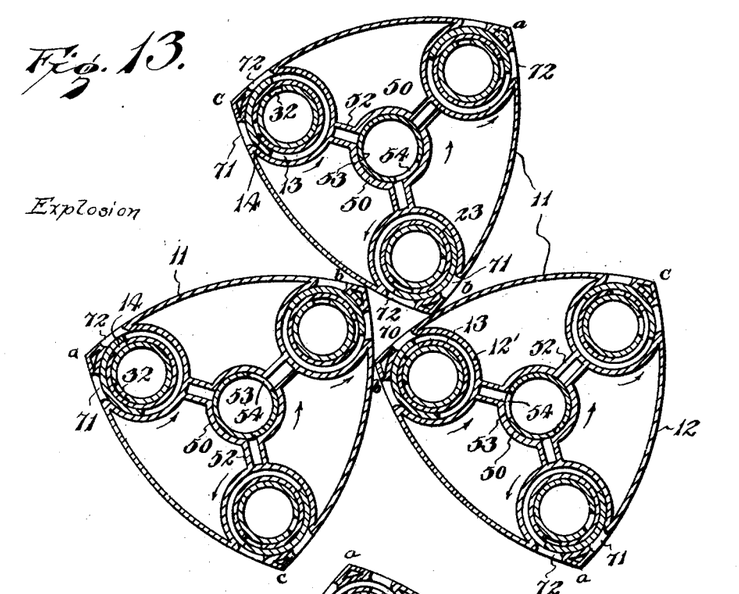
Figure 13 is a diagrammatic view showing the rotors in position for the explosive action.
Figure 14:
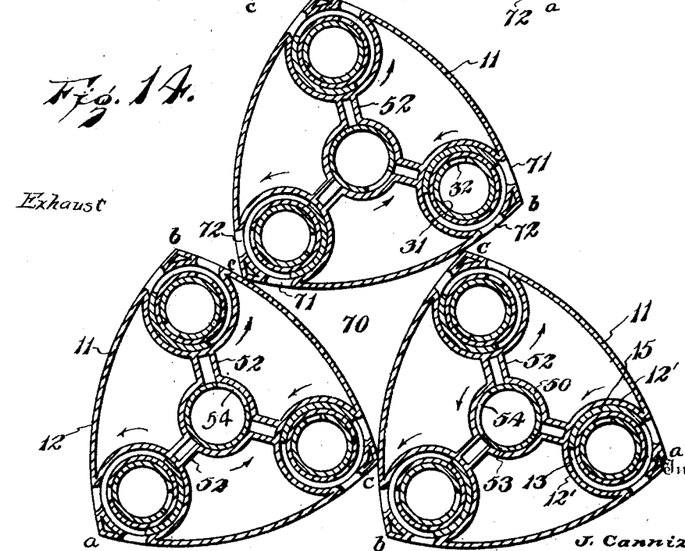
Figure 14 is a diagrammatic view showing the rotors in the position assumed for exhaust.
Figure 14A:
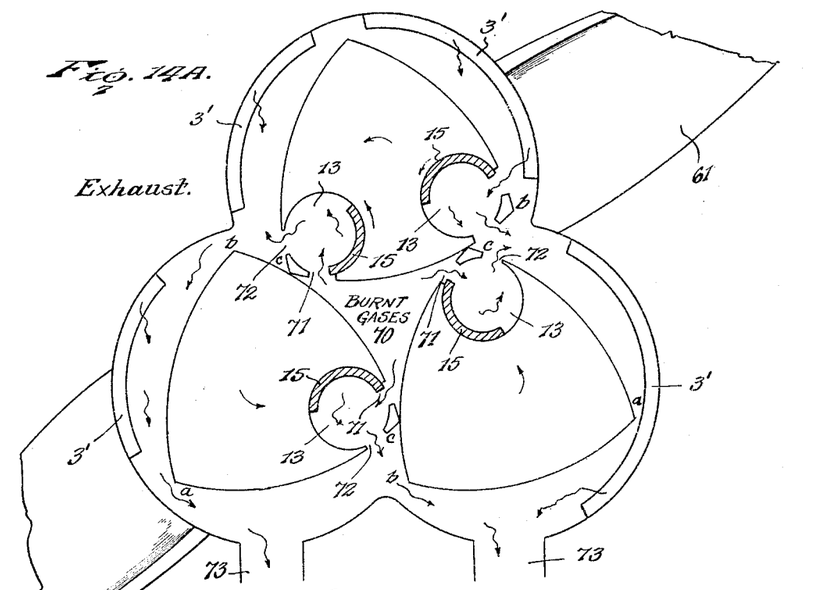
Fig. 14A is a view similar to Fig. 14 but showing only the valves illustrated in Fig. 11A.

The rotors now move to their compressing positions, as shown in Figures 12 and 12A, and at which time the ports 32 and 14 are closed to permit the fuel to be compressed by the rotors during their movements, the compressed fluids passing through the ports 71 formed in said rotors and at which time the companion ports 72 are closed. At the end of the compression cycle both ports 71 and 72 are closed. The explosion takes place in the chambers 13 when the rotors are in the position, as shown in Figures 13 and 13A, and the ports 32 and 14 still being closed the explosive charge enters the chamber 70 and drives the rotors counter-clockwise, thus transmitting rotary movement to the respective shafts 40 which is transmitted to the gear 59 to drive the propeller. The exhaust takes place when the rotors assume the position shown in Figures 14 and 14A, and at which time the combustion chambers 13 and chamber 70 are open to atmosphere through the ports 71 and 72. The rotation and timing of the valve plates 15 and ports 32 of the casing 27' is controlled by the shafts 46 and pinions 47 and 48, it being apparent that as the rotors turn the fixed gears 44 will cause rotation of the shafts 46 to rotate said valve plates and casing 27 to successively move the ports 14 and 32 into and out of registration, this operation being due to the fact that the collars 43 are maintained stationary, and the housing 45 will travel therearound, thus transmitting rotary movement to the valve parts.

Since the rotors are of shell-like formation the blast from the propeller will pass through their interiors and through the openings 2 and 3 and around the combustion chambers to maintain the same cool and will also pass around the same through the openings 3', and at the same time scavenge the combustion chambers which are open to atmosphere at times. The air passing around the rotor will discharge through the exhaust pipes.

Figures 11 to 14 are diagrammatic and illustrate the positions of the various parts as if the lines 8—8 and lines 9—9 of Figure 4 were in the same plane in order to show the relative position of the valve plates 15 and ports 32 of the casing 27. In these views are also designated apexes of the rotors with the letters $a$, $b$ and $c$ to indicate the various positions assumed thereby during their operation. Obviously, the exhaust gases will enter the casing 1 and pass therefrom through the exhaust pipes 73.

It will be pointed out that in Figs. 11A, 12A, 13A, 14A and 15, the operation of the ports 71 and 72 is shown separate from the operation of the port 32, but in correspondence with the operation ports 32. Port 32 only registers during the intake cycle. It takes no part in the operation of the other three cycles. See Fig. 9 and Fig. 11B. As shown in Fig. 11A, the ports 71 and 72 permit the entry of air to the chamber 70 during intake. During this cycle, gas enters chamber 70 through port 32, see Fig. 11B.

With respect to the system of intake used in this engine, the method of applying sufficient suction on the gas supply is to retard the opening of port 72 to a later point of the intake stroke, and advance the opening of the port 32 to the very beginning of this stroke. In this way, there is accomplished the admission of a rich vapor before the admission of air through the ports 71 and 72. Of course, a supercharger or blower may be attached between the intake manifold 56 and the carbureter 51, if desired, to induce forced gas intake.

It will be further pointed out that, as above described, there is a combustion chamber at each apex of each rotor, they are similar, and their respective members perform the same movements at the same time. See Figs. 11, 12, 13 and 14. They all operate as combustion chambers, in consecutive order, not at the same time. Because of this, they have long cooling intervals.

The rotational angle of duration of one cycle is 60° or one-sixth of one revolution. This being a four-cycle engine, it performs its four cycles in four-sixths of one revolution. Because of this, successive apices, in returning to coacting contact at successive revolutions, return at different cycles of valve arrangement. Therefore, the apex which took part in the explosion cycle of the first four cycles is not the same apex which will perform in the explosion cycle of the next four cycles.

As each operating apex remains in coactive contact with the adjacent rotors for two-sixths of one revolution, it will be seen that first one side of the apex performs one cycle, and then the other side of the same apex performs the next cycle.

Thus, it will be seen, Fig. 12 and 12A, that the side of apex $b$ having the port 71 is performing the compression cycle. Then, in Fig. 13 and Fig. 13A, it will be seen that the other side of apex $b$ having the port 72 is performing the explosion cycle. From this, it is evident that each successive apex performs two cycles at every revolution.

Therefore, starting at apex $a$, Fig. 11 and Fig. 11A, we perceive that apex $a$ must have just completed the exhaust cycle and that the successive cycles are performed by successive apices in the following order:

|        | Cycles          | Cycles         | Rev's. |
|--------|-----------------|----------------|--------|
| Apex a | (1) Exhaust     | (2) Intake     | 2/6    |
| Apex b | (3) Compression | (4) Explosion  | 4/6    |
| Apex c | (1) Exhaust     | (2) Intake     | 1      |
| Apex a | (3) Compression | (4) Explosion  | 1 2/6  |
| Apex b | (1) Exhaust     | (2) Intake     | 1 4/6  |
| Apex c | (3) Compression | (4) Explosion  | 2      |

Checking each successive explosion in the above table, it will be seen that each apex successively takes part in an explosion cycle, and, therefore, all apex chambers are explosion chambers.

Figure 10:
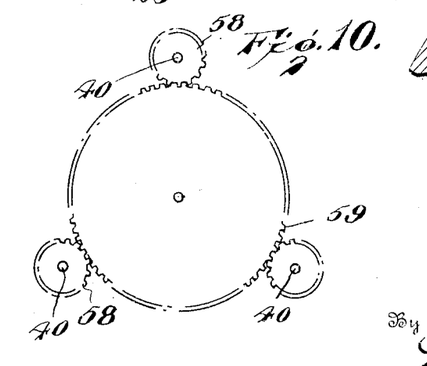
Figure 10 is a view of the propeller shaft operating gearing.

It will be further pointed out that the ignition system is shown diagrammatically in Fig. 15 to comprise a commutator formed of three copper bars insulated from each other and from the shaft. Each of these bars moves consecutively in contact with a carbon brush mounted in a holder 63, from which it is insulated by a sleeve which can be seen in Fig. 4. The carbon brush is stationary in a position which corresponds to the arc through which the apex of the rotor must travel during its explosion cycle. This commutator, however, does not prevent sparking during the intake cycle. Therefore, it is necessary to have a distributer operating in conjunction with it, as shown. This distributer is operated from the top gear 58, Fig. 10, and the manner in which the distributer operates is diagrammatically shown in Fig. 15. The gear ratio is 2 to 3, the same as the valves, therefore having the same cyclical correspondence, in this way enabling it to close the electric circuit only during the period of the explosion cycle.

From the foregoing, it is thought that the construction, operation and many advantages of the herein described invention will be apparent to those skilled in the art without further description, and it will be understood that various changes in the size, shape and proportion and minor details of construction may be resorted to without departing from the spirit, or sacrificing any of the advantages of the invention.

Having thus described the invention, I claim:

1. An engine of the class described comprising a plurality of triangular shaped rotors arranged to define a triangular shaped expansible chamber therebetween, said rotors each having a combustion chamber in each corner thereof, rotary inlet and exhaust controlling valves carried by the rotors for successive communication with the expansible chamber, and means for controlling the admission of fuel to the combustion chambers and the exhaust of gases therefrom into the expansible chamber.

2. An engine of the class described comprising a plurality of rotors defining an expansible chamber, said rotors having combustion chambers therein, a drive shaft connected with each rotor for rotation therewith, valve structures in the rotors, means extended between the valve structures and shafts and rotatable with the rotors for controlling the valve structures to admit fuel to the combustion chambers, and exhaust of gases therefrom into the expansible chamber.

3. An engine of the class described comprising a plurality of rotors having combustion chambers therein, said rotors defining an expansible chamber therebetween, valve structures in the rotors for operation in the combustion chambers thereof, gears connected with the valve structures, shafts extending between the gears and fixed gears of the valve structures and having geared connection therewith, for operating the valve structures during rotation of the rotors for controlling the flow of fuel to the combustion chambers and the admission of gases from the combustion chambers into the expansible chamber and the exhaust thereof from the expansible chamber.

4. An engine of the class described comprising a plurality of rotors, said rotors having combustion chambers therein provided with valve structures, an expansible chamber between the rotors, fixed gears, shafts supporting the rotors and rotatable in the gears, and means connecting the valve structures and fixed gears for controlling the operation of the valve structures during rotation of the rotors, to control the admission of fuel to the combustion chambers and the exhaust of the exploded gases into the expansible chamber.

5. An engine of the class described, comprising a plurality of rotors having combustion chambers therein, valve structures in the combustion chambers, fixed gears, manifolds alined with said gears, shafts rotatable in the gears and manifolds and fixed to the rotors, means for conducting fuel from the manifolds to the combustion chambers, means connecting the valve structures and said fixed gears for controlling the admission of fuel to the combustion chambers and the exhaust of the exploded gases therefrom.

6. An engine of the class described comprising a plurality of triangular shaped rotors defining an expansible chamber therebetween, said rotors having a plurality of combustion chambers therein for successive communication with the expansible chamber, valve structures in the combustion chambers operable during the rotation of the rotors to control the admission of fuel to the combustion chambers and the exploded gases therefrom into the expansible chamber, as and for the purpose set forth.

7. An engine of the class described comprising a plurality of rotors having combustion chambers therein, and defining an expansible chamber therebetween, the combustion chambers having valve structures therein and having ports opening into said chambers, means for controlling the passage of exploded gases from the combustion chambers into said chamber, said means also serving to admit fuel to the said chambers during rotation of the rotors.

In testimony whereof I affix my signature.

JOSEPH CANNIZZARO. [L. S.]